US008724799B2

(12) United States Patent
Dortschy et al.

(10) Patent No.: US 8,724,799 B2
(45) Date of Patent: May 13, 2014

(54) OPERATING POINTS FOR SPECTRUM MANAGEMENT IN DIGITAL SUBSCRIBER LINES

(75) Inventors: Boris Dortschy, Hägersten (SA); Johelden Campos Bezerra, Belem-Pará (BR); Aldebaro Klautau, Marco-Belem-Para (BR); Eduardo Lins de Medeiros, Hägersten (SE); Marcio Murilo Conte Monteiro, Belém (BR)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 126 days.

(21) Appl. No.: 13/321,772

(22) PCT Filed: May 29, 2009

(86) PCT No.: PCT/SE2009/050631
§ 371 (c)(1),
(2), (4) Date: Nov. 21, 2011

(87) PCT Pub. No.: WO2010/138043
PCT Pub. Date: Dec. 2, 2010

(65) Prior Publication Data
US 2012/0063590 A1 Mar. 15, 2012

(51) Int. Cl.
H04M 9/08 (2006.01)
(52) U.S. Cl.
USPC ..................... 379/406.06; 375/346
(58) Field of Classification Search
USPC ........ 379/406.01–406.16, 417; 375/277, 254, 375/278, 284, 285, 296, 346, 367
See application file for complete search history.

(56) References Cited

U.S. PATENT DOCUMENTS

| | | | |
|---|---|---|---|
| 6,999,583 B2 * | 2/2006 | Valenti et al. | 379/417 |
| 7,158,563 B2 * | 1/2007 | Ginis et al. | 375/224 |
| 2002/0041565 A1 * | 4/2002 | Valenti et al. | 370/201 |
| 2002/0136397 A1 * | 9/2002 | Zeng et al. | 379/417 |
| 2003/0112967 A1 * | 6/2003 | Hausman et al. | 379/417 |
| 2006/0274893 A1 * | 12/2006 | Cioffi et al. | 379/399.01 |
| 2007/0274404 A1 * | 11/2007 | Papandriopoulos et al. | 375/260 |
| 2008/0212768 A1 * | 9/2008 | Zhou | 379/417 |
| 2009/0034554 A1 * | 2/2009 | Evans et al. | 370/468 |

OTHER PUBLICATIONS

Raphael Cendrillon, Optimal Multiuser Spectrum Balancing for Digital Subscriber Lines, IEEE Transactions on Communications, vol. 54, No. 5, May 2006.*

(Continued)

*Primary Examiner* — Fan Tsang
*Assistant Examiner* — Akelaw Teshale

(57) ABSTRACT

A method of determining a number of operating points for spectrum management of a plurality of digital subscriber lines in a communications network, the method comprising the steps of: determining optimization criteria ($O_i$) for the digital subscriber lines; determining crosstalk gains ($G_i$) for the digital subscriber lines; determining an initial population ($P_i$) of operating points ($x_1, \ldots, x_Z$) where each of the operating points comprises importance ratings for each digital subscriber line of the plurality of digital subscriber lines; calculating new values of crosstalk and power spectrum densities (S) for the digital subscriber lines, by executing spectrum balancing for each operating point until the optimization criteria are fulfilled; calculating a new population of operating points, by executing an evolutionary algorithm; and iteratively performing the steps of calculating until a predefined stopping criterion is fulfilled.

9 Claims, 2 Drawing Sheets

(56) References Cited

OTHER PUBLICATIONS

Meiqin Tang, Chengnian Long, Xinping Guan: "An optimal spectrum-balancing algorithm for digital subscriber lines based on particle swarm optimization", International Journal of Communication Systems 21 No. 9 pp. 971-985 2008 Retrieved from the internet http://dx.doi.org/10.1002/dac.931 Abstract: p. 973 line 18. page 974 lines 21-22, 24-26, p. 977 lines 1-3, 7-14.

* cited by examiner

OPERATING POINTS FOR SPECTRUM MANAGEMENT IN DIGITAL SUBSCRIBER LINES

TECHNICAL FIELD

The invention relates a method, system and computer program for spectrum management in a digital subscriber line system in a communications network.

BACKGROUND ART

Today most of a local telephone company network is the local subscriber loop, i.e., the loop from a central office (CO) to subscriber equipment such as a landline telephone. The local subscriber loop is presently being used to provide broadband digital communication services such as digital subscriber line (DSL) service. Such broadband DSL services include integrated services digital subscriber network (ISDN), high-rate digital subscriber line (HDSL), asymmetrical digital subscriber lines (ADSL) and very high rate digital subscriber lines (VDSL) technology. DSL services allow subscribers to send and receive digital data at higher rates of speed than were previously possible using analog modem technology.

DSL technology exploits existing metallic telephone loop plants to provide megabit per second (Mbps) high-speed Internet access and other services and the great majority of subscribers are served by such metallic (copper) twisted pair cables connected from a local switch in the CO to the subscriber equipment, for allowing telephone and DSL signals to travel on the cables.

There are many impairments to DSL transmission including loop loss and crosstalk, as DSL signals are attenuated and distorted by transmission through the loop, particularly at high frequencies and on loops with bridged tap. Some of the power of a DSL transmitting on a loop travels through a crosstalk-coupling path and generates crosstalk noise into other DSLs on loops in the same cable. Additional impairments include electromagnetic interference due to radio ingress, which appears as narrowband noise spikes in the frequency domain, and impulse noise which occurs as brief spikes in the time domain. However, crosstalk that generally increases with increasing frequency often becomes the major limitation to high-speed DSL.

If a DSL or other system transmits with a power spectral density (PSD) on one pair of a multi-pair cable, resulting crosstalk couples into a nearby pair, whereas the crosstalk can be calculated by multiplying the transmit PSD with a crosstalk coupling function or crosstalk gain function in the frequency domain. In this context, the so called "spectral compatibility" is the property that crosstalk between different systems that transmit in the same twisted-pair cable does not significantly degrade the performance of any of the systems. Spectrum management is the process of deploying DSLs in the loop plant (communication network) in such a manner that ensures spectral compatibility. During this management, spectrum balancing algorithms are used to optimize PSD for the DSLs to find suitable operating points, i.e. conventional parameters for controlling the DSLs.

Current techniques for spectrum management apply relatively rigid rules uniformly across the entire loop plant, as embodied in ANSI T1.417, the Spectrum Management Standard developed by ANSI-accredited DSL standards committee TIE1.4. For example, these rules do not take into account the individual types of crosstalk sources and crosstalk couplings of a particular cable, which may be considerably different than the worst-case couplings that are assumed in the spectrum management standard. Dynamic Spectrum Management (DSM) technology intends to consider scenario dependent conditions and requirements, such as cable properties, power consumption and system performance. Current DSM techniques, such as SCALE (Successive Convex Approximation for Low-complexity), try to optimize operational parameters for a specific set of constraints and requirements. The existence of a solution is not known in advance and a solution is isolated in that it is valid for the assumed constraints and requirements only.

Other techniques related to spectrum management is described in U.S. Pat. No. 7,106,833, U.S. Pat. No. 7,151,803 and U.S. Pat. No. 7,158,563.

SUMMARY

In view of the foregoing, the applicant has appreciated that there is a need of improvement of prior art, in particularly in terms of efficiently providing operating points for spectrum management where individual types of crosstalk sources and couplings of a particular cable are taken into account.

Hence a method is provided for determining a number of operating points for spectrum management of a plurality of digital subscriber lines in a communications network. The method comprises the steps of: determining optimization criteria for the digital subscriber lines; determining crosstalk gains and possibly also noise sources for the digital subscriber lines; determining an initial population of operating points where each of the operating points comprises importance ratings for each digital subscriber line of the plurality of digital subscriber lines; calculating new values of crosstalk (and possibly noise sources) and power spectrum densities for the digital subscriber lines, by executing spectrum balancing for each operating point until the optimization criteria are fulfilled; calculating a new population of operating points, by executing an evolutionary algorithm, and iteratively performing the steps of calculating until a predefined stopping criterion is fulfilled.

As known within the art, crosstalk gain, which can be referred to as crosstalk coupling, is the ratio of the power in a disturbing cable to the induced power in the disturbed cable observed at specified points of the cables under specified conditions.

Here, an operating point is described by at least the PSDs of all DSLs and the channel information (CI). The CI includes, for example, the gains of all direct and crosstalk channels of the DSLs. Based on both CI and PSDs, it is possible to calculate e.g. bit rates, total power and margin for all users. As can be seen, power spectrum densities are calculated in the iterative process, as it is not always necessary to determine initial values of power spectrum densities.

When compared to the situation in which all users have the same PSD, spectrum balancing can lead to substantial improvements in rate and reach of DSL services. This improvement is more prominent in "near-far" scenarios, where some (near) users receive a strong DSL signal, i.e. have high gains in their direct channels, compared to others (far users).

The optimization conducted by spectrum balancing adopts figures of merit, or so called objective functions such as "maximizing bit rate" or "minimizing total power", and has constraints such as the maximum power or minimum bit rate per user, respectively. With the objective function and constraints defined, the spectrum balancing algorithm receives the CI as input and calculates the PSDs.

The spectrum balancing for each operating point until the optimization criteria are fulfilled is, for example, based on a conventional weighted-sum algorithm that solves the spectrum balancing. Since the weights are varied when a new population is created, many different solutions of operation points can be found. It can also be said that the inventive method is a meta learner (an algorithm) that uses a spectrum balancing algorithm as base learner.

Examples of two approaches that can be used in spectrum management are the rate-adaptive (RA) and the power-adaptive (PA). In brief, in the RA approach, the goal is to maximize the bit rate. This typically implies using the maximum power. In PA, the object is to minimize total power while achieving a minimum target rate.

The invention is advantageous in that, as opposed to conventional spectrum balancing, it solves the problem of finding a set of operating points that are both optimal and diverse. In brief, a set is diverse if it describes several possible solutions (operating points) that fulfill the optimization criteria. The requirement of diversity is relevant because, in an extreme case, all elements of the solution set could be instances of exactly the same operating point. Also, from the perspective of a DSL network operator at the stage of planning the deployment of a new DSL technology, it is important to obtain diverse operating points.

Moreover, computational cost of the calculation aiming towards suitable operating points is alleviated by the adoption of the evolutionary computing algorithm. More specifically, the invention uses a multi-objective evolutionary algorithm to find operating points that are non-dominated solutions located on Pareto fronts. The invention has shown, as will be later described, that a more diverse set of operating points may be provided with significantly less computational cost in comparison with many conventional approaches.

Of course, when iteratively performing the steps of calculating, the steps of executing the spectrum balancing and the evolutionary algorithm are included in the iteration, as the spectrum balancing and the evolutionary algorithm are integrated in the steps of calculating.

The importance ratings for each digital subscriber line of the plurality of digital subscriber lines may describe a mutual ranking of the digital subscriber lines.

The importance ratings can be seen as a weight assigned to every DSL and the weight magnitude indicates to the optimization routine the importance of the respective DSL when compared to the others. In practice, the weights are typically not known in advance but are found by using the evolutionary algorithm in order to achieve operation points.

The predefined stopping criterion may be based on a number of iterations. The stopping criterion can also be based on various other criteria, such as stopping when new populations do not longer render any improvement when performing spectrum balancing.

The executing of the spectrum balancing may comprise using a weighted sum algorithm for combining a number of optimization criteria.

The optimization criteria may comprise a minimum bit rate for each digital subscriber line.

The optimization criteria may comprise a maximum transmit power for the digital subscriber lines.

According to another aspect of the invention, a system is provided for determining a number of operating points for spectrum management of a plurality of digital subscriber lines in a communications network. The system comprises: means for determining optimization criteria for the digital subscriber lines; means for determining crosstalk gains for the digital subscriber lines; means for determining an initial population of operating points where each of the operating points comprises importance ratings for each digital subscriber line of the plurality of digital subscriber lines; means for iteratively calculating, until a predefined stopping criterion is fulfilled, i) new values of crosstalk and power spectrum densities for the digital subscriber lines, by executing spectrum balancing for each operating point until the optimization criteria are fulfilled, and ii) a new population of operating points, by executing an evolutionary algorithm.

As for the method, in the system the importance ratings for each digital subscriber line of the plurality of digital subscriber lines describes a mutual ranking of the digital subscriber lines. Moreover, the predefined stopping criterion can be based on a number of iterations, and the executing of the spectrum balancing can comprise using a weighted sum algorithm for combining a number of optimization criteria.

The optimization criteria can comprise a minimum bit rate for each digital subscriber line, and/or a maximum transmit power for the digital subscriber lines.

According to still another aspect of the invention, a computer program is provided for determining a number of operating points for spectrum management of a plurality of digital subscriber lines in a communications network, comprising code means which when run on a computer system causes the computer system to: determine optimization criteria for the digital subscriber lines; determining crosstalk gains for the digital subscriber lines; determine an initial population of operating points where each of the operating points comprises importance ratings for each digital subscriber line of the plurality of digital subscriber lines; calculate new values of crosstalk and power spectrum densities for the digital subscriber lines, by executing spectrum balancing for each operating point until the optimization criteria are fulfilled; calculate a new population of operating points, by executing an evolutionary algorithm; and iteratively perform the steps of calculating until a predefined stopping criterion is fulfilled.

According to a further aspect of the invention, a computer program product is provided, comprising a computer readable means and a computer program according to the description above, stored on the computer readable means.

The inventive system, computer program and computer program product may be configured/comprise means for implementing any of the features described above in association with the inventive method, and shares the corresponding advantages.

BRIEF DESCRIPTION OF THE DRAWINGS

Embodiments of the invention will now be described, by way of example, with reference to the accompanying schematic drawings, in which.

DETAILED DESCRIPTION

In general, when determining a diverse set of operating parameters, weights of a respective DSL are systematically varied, the spectrum balancing algorithm for each weight combination is invoked and distinct operating points are found by "navigating" through the rate region. However, the mapping between weights and objective functions is typically non-linear and it is non-trivial to find a diverse set of optimal solutions by discretizing the space spanned by the weights.

Figure 1:
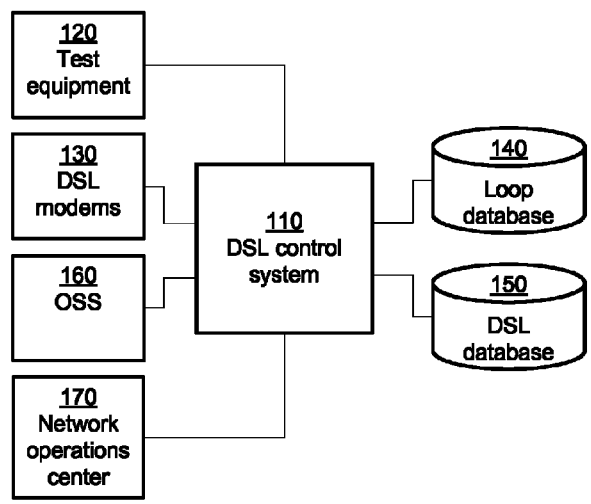
FIG. 1 illustrates infrastructure components of a DSL control system in accordance with an embodiment of the invention.

FIG. 1 illustrates the relationship of a DSL control system with the components of current communications networks offering DSL service. A DSL control system 110 uses information from automated test equipment 120 to receive information about the various DSL connections (loops) that it is handling. The DSL control system 110 is connected to one or more DSL modems 130 (subscriber equipments) through which DSL service is provided to subscribers. An existing loop database 140 provides the DSL control system with information about the existing network and loop topology, such as the distance from a central office to various subscriber equipments as well as the presence of bridge taps. The DSL database 150 is a repository for information regarding the transmission environment of the various types of DSL being transmitted over a given bundle of lines, which enables the DSL control system to use previously developed information on the current DSL subscribers in managing the addition or deletion of additional subscribers. An Operations Support System (OSS) 160 is also included, which comprises conventional software used by the telecommunications service providers to support the operation of the telephone network and includes functions such as provisioning, billing, repair and customer service. The OSS 160 relies on the DSL control system 110 to provide management of a number of DSL subscribers. A network operations center 170 is responsible for the operation of the physical network and provides additional data on network topology to the DSL control system 110.

Figure 2:
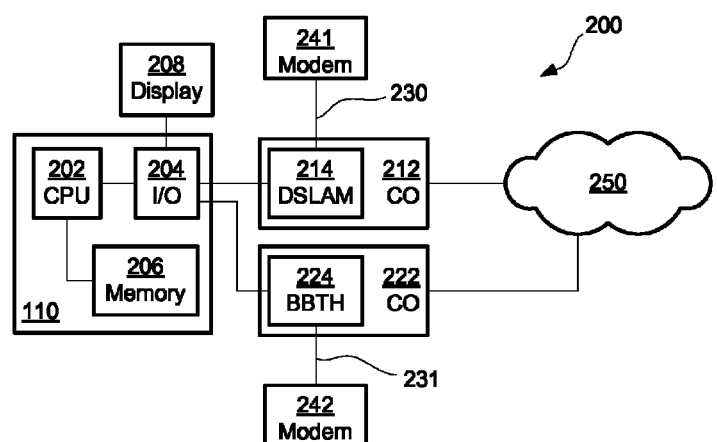
FIG. 2 illustrates a DSL control system for implementing the methods of an embodiment of the invention.

FIG. 2 illustrates a communications network 200, and, in more detail, the dynamic spectrum management system 110 which comprises a processor 202 (CPU) and associated input/output (I/O) unit 204 and memory unit 206 that can include either primary memory, such as RAM, or secondary memory, such as a magnetic disk drive or other storage media or a combination thereof. The I/O unit 204 is configured to receive data about DSL loops 230 of which one extends from a first DSL subscriber modem 241 to a central office (CO) 212, which then enables the DSL modem 241 to communicate with a communications network 250 such as the Internet. The first DSL subscriber modem 241 is connected to the central office 212 through a digital subscriber line access multiplier (DSLAM) 214 arranged in the central office 212 of the communication network. This DSLAM 214 is also used to send data about the loop 230.

In its most general definition, the spectrum management system 110 is a system configured to determine a number of operating points for spectrum management of a plurality of digital subscriber lines in a communications network. Here, the digital subscriber lines can bee seen as the loops 230, 231, or be seen as the loops 230, 231 in combination with a respective DSL modem 241, 242.

A further DSL subscriber modem 242 is connected to a further central office 222 via further loop 231. The automated test equipment 120, which can be a broadband test head (BBTH) 224 provides information to the I/O unit 204 of the DSL control system 110 and are arranged according to known standards and techniques. The BBTH has the ability to identify the composition or make up of the loop 231 from the central office 222 to the remote DSL subscriber modem 242 and to provide information on the suitability of the loop 231 for DSL service.

Electrical properties of individual loops 230, 231 are measured. The BBTH 224 can access the loop 231 in the central office 222 through metallic test leads and can directly measure the loop response and the received noise. The BBTH 224 can excite a pair of wires comprising a loop 231 with a signal and measure the received signal on another pair to measure the crosstalk coupling (gain). Alternatively, the crosstalk coupling can be reconstructed from the received crosstalk. This is done by first estimating or determining from the records what the transmit PSD of the crosstalker is, and then by using the combination of the estimated transmit PSD of the received crosstalk PSD to estimate the crosstalk coupling. Such estimation can be done with a number of simultaneous crosstalkers. Crosstalk and received noise at the CO 222 end of the loop 231 is directly measured while crosstalk and received noise can be inferred by first estimating the types of crosstalkers at the CO 222 end.

Devices that measure the crosstalk gain or properties thereof at the receiver of an existing DSL modem can also be used. The purpose of a receiver is to estimate the transmit signal or properties thereof from a received signal plus noise, an in so doing it essentially estimates the received crosstalk noise at each sample. Also, a typical DSL system combines a number of DSL modems into a DSL access multiplexer (DSLAM) 214 at a central office, and the signal and received crosstalk noise is typically available as data such as bits and gain tables. Recent standards, such as the new ITU standard G.992.3, provide standardized interfaces for obtaining these measurements from DSL modems 241 or 242 or DSLAMs 214. Crosstalk, crosstalk gain and received noise or properties thereof at both ends of the loop can be measured directly by these devices.

Additional components of the system include various methods that are implemented in software stored in memory unit 206 and executed on processor 202. These include e.g. the software-implemented methods necessary to identify crosstalk and crosstalk gain. Also the more specific method, which is further described below, that is used for determining operating points for managing the loops 230, 231 is implemented in software stored in memory unit 206 and executed on processor 202. In this context, managing a loop should be understood as the determining of a number of operating points for spectrum management of digital subscriber lines (DSLs), i.e. loops, in a communications network.

A display 208 can be used to display graphical and textual information related to the operation of the PSD measurements and crosstalk identification. Other input/output devices (not shown) can also be used in cooperation with the I/O unit 204 in order to provide a user interface to the DSL control system 110 as necessary.

Certain DSL impairments often occur between the central office 212 and the subscriber 241 over loop 230. The main impairments are loop and bridge tap loss, crosstalk, EMI radio ingress, impulse noise, and background noise. However, crosstalk often overshadows other impairments.

Figure 3:
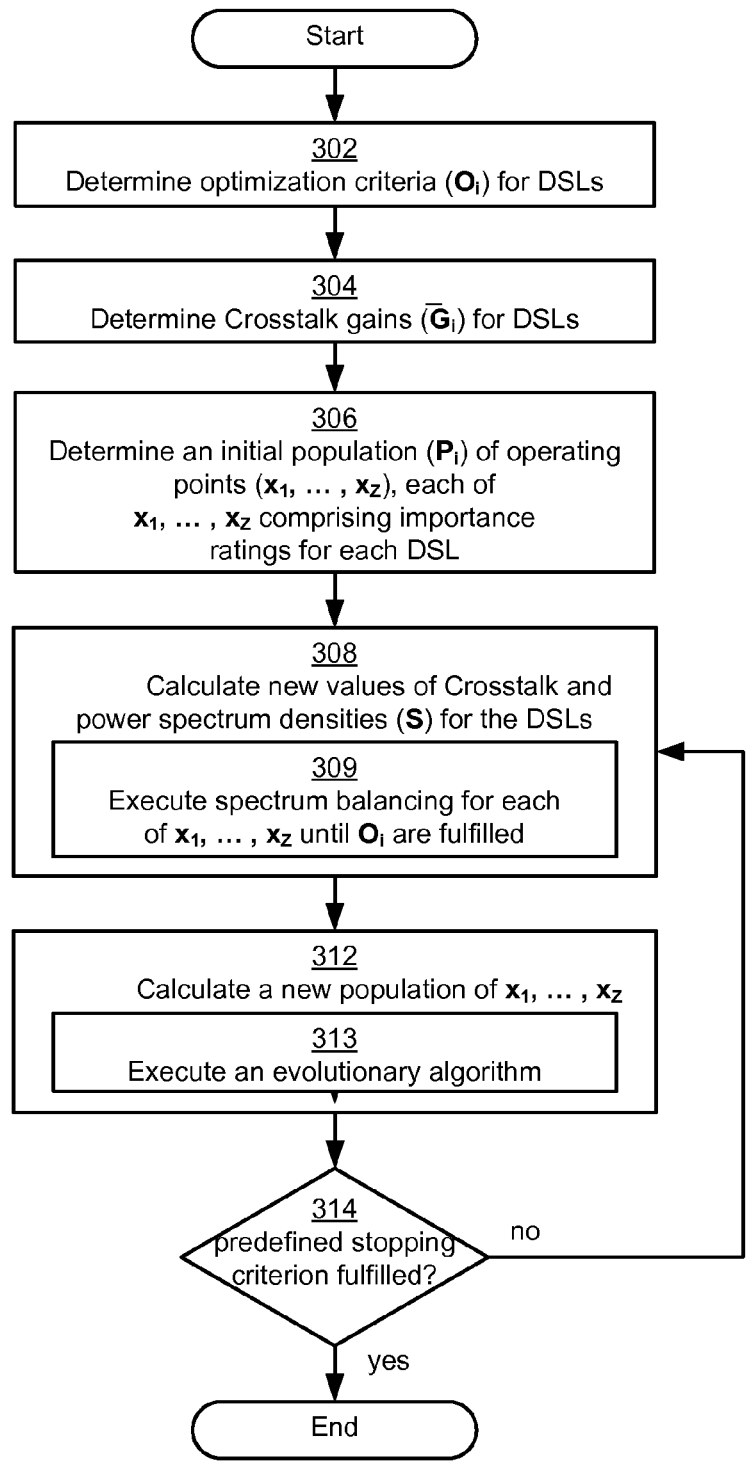
FIG. 3 is a flow diagram of an embodiment of the inventive method performed in the DSL control system of FIGS. 1 and 2.

FIG. 3 illustrates the method used by the system for determining the operating points for spectrum management of a number N of digital subscriber lines, such as the digital subscriber lines 230, 231 in the communications network 200 of FIG. 2. After the method is initialized, the first step is to determine 302 optimization criteria (Oi) for the digital subscriber lines. Next, crosstalk gain ($\overline{G}_i$) for the digital subscriber lines is determined 304, and after this an initial population (Pi) of operating points (x1, ..., xZ) is determined 306, where each of the operating points comprises importance ratings for each digital subscriber line 230, 231.

Thereafter new values of crosstalk and power spectrum densities (S) for the digital subscriber lines are calculated 308, by executing 309 spectrum balancing for each operating point until the optimization criteria are fulfilled. This step is followed by the step of calculating 312 a new population of operating points, which is done by executing 313 an evolutionary algorithm. Finally, the steps of calculating 308, 312 are iteratively 314 performed until a predefined stopping criterion is fulfilled. Performing the calculations 308, 312 includes of course execution of spectrum balancing and the execution of the evolutionary algorithm.

In more detail, when executing the method it can be assumed that the DSL line code is discrete multitone (DMT). The PSDs of all modems are organized in a matrix S. Matrix S has dimension N×K, where K is the number of subchannels (tones) and the element $s_n^k$ of S is the PSD value of user n at tone k. The channel gains (direct and crosstalk) are represented by a three-dimensional array $\overline{G}$ of dimension N×N×K. In some circumstances, $\overline{G}$ may be completely known, but in most practical scenarios, only the direct channels can be accurately estimated. Noise sources other than the crosstalk among the N users are described by a matrix B of dimension N×K. The element $b_n^k$ of B, of user n at tone k is the value of the PSD representing the combined effect of DSL impairments like background noise, radio-frequency interference, alien crosstalk, etc. The channel information (CI) is assumed to be described by the two arrays (B, $\overline{G}$).

An operating point (S, B, $\overline{G}$) is fully described by the channel state information (B, $\overline{G}$) and PSDs S. Given (S, B, $\overline{G}$), the system can calculate, for example, the rate $r_n = R_n(S, B, \overline{G})$ and power $p_n = P_n(S, B, \overline{G})$ of the n-th user, where $R_n$ and $P_n$ are the corresponding (many-to-one) mappings.

The multi-objective formulation of the spectrum balancing problem corresponds to an optimization that seeks the best PSDs S according to:

$$\left.\begin{array}{l} \max \quad O_i(S, B, \overline{G}), i = 1, \ldots, L \\ \text{s.t.} \quad q_j(S) \leq 0, j = 1, \ldots, Q \\ \quad\quad t_m(S) = 0, m = 1, \ldots, T \\ \quad\quad 0 \leq s_n^k \leq M_k, k = 1, \ldots, K \end{array}\right\} \quad (1)$$

where $O_i$ (the arguments are omitted for simplicity) is the i-th objective function, which can be, for example, the minimum power of a certain line or lines, or the maximum transmission rate over relevant transmission lines. The functions $q_j$ and $t_m$ are, respectively, inequality and equality constraints imposed to the solution. The values $M_k$ correspond to a PSD mask typically imposed by DSL standards and hardware limitations, with $M_k$ being the value at the k-th tone. The constraints and objective functions can be given, for example, in terms of margin, power and rate. A value function can be also used. For example, if the user has prices defined for specific rates, a value function can be set to maximize profit.

Each objective function $O_i$ can be maximized or minimized, but it is useful to use the fact that minimizing a function $O_i$ is equivalent to maximizing $-O_i$, and have only maximizations.

Multi-objective optimization can be solved by converting the optimization into a single-objective by constructing a single aggregate objective function (AOF). That to combines all objective functions into a single functional form. A well-known combination is the "weighted linear sum" of the objectives or weighted sum. In this case, scalar weights can be specified for each objective to be optimized, and then the weighted sum of objectives is combined into a function that can be solved by any single-objective optimizer. The solution obtained will depend on the values, or more precisely, the relative values, of the weights specified.

Conventional rate-adaptive spectrum balancing is a special case of the multi-objective formulation of Eq. (1) above, in which there is only one (L=1) objective function $O_1 = w_1 r_1 + \ldots + w_N r_N$. Also, there are Q=N inequalities $q_n = p_n - p_n^{max} \leq 0$, $\forall n$ which constrain the maximum power per user $p_n^{max}$, no equality constraints (T=0) and, typically, there are no PSD masks, i.e., $M_k = \infty$, which results in a conventional single-objective formulation:

$$\max O_1 = \sum_{n=1}^{N} w_n r_n \quad (2)$$
$$\text{s.t.} \quad p_n \leq p_n^{max}, n = 1, \ldots, N$$

Here, a solution (a set of operating points) is feasible if the constraints in Eq. (1) are satisfied. The set of all feasible solutions is the feasible region or the search space. The L-dimensional vector $O = (O_1, O_2, \ldots, O_L)$ with the values of all objective functions is located in a multidimensional space that can be called objectives space. This is a fundamental distinction with respect to a single-objective optimization problem, which has a one-dimensional objectives space. Instead of a unique solution to the problem, which is the case in single-objective optimizations, the solution to a multi-objective problem is a (possibly infinite) set of Pareto points.

Solutions, Pareto optimal, are those for which improvement in one objective can only occur with the worsening of at least one other objective. More formally, S* is Pareto optimal if there does not exist another S such that $O_i(S) \leq O_i(S^*)$ for all $i=1, \ldots, L$ and that $O_j(S) \leq O_j(S^*)$ for at least one $j=1, \ldots, L$. For a given system, the Pareto frontier is the set of solutions that are all Pareto optimal. By yielding all of the potentially optimal solutions, a system operator can make focused tradeoffs within this constrained set of parameters, rather than needing to consider the full ranges of parameters.

The method searches for a diverse set of ZPareto optimal operating points. Here, an optimal operating point, when using rate-adaptation, must belong to the Pareto frontier corresponding to the optimization of Eq. (1) with $O_n = r_n$ and $q_n = p_n - p_n^{max} \leq 0$, $\forall n$. In summary, all Z operating points can be non-dominated solutions of:

$$\left.\begin{array}{l} \max r_n, \quad n = 1, \ldots, N \\ \text{s.t.} \quad p_n \leq p_n^{max}, \quad n = 1, \ldots, N \end{array}\right\} \quad (3)$$

Ideally, together these operating points should compose a diverse set.

The Pareto frontier of the optimization in Eq. (3) is referred to as rate region as it characterizes all Pareto optimal data rate combinations among modems.

In other words, the described method uses a multi-objective evolutionary algorithm to search for the diverse set of operating points. The search uses a hybrid approach, where the evolutionary algorithm guides the search for a Pareto-optimal and diverse set of points, while a local search based on a weighted-sum spectrum balancing algorithm such as SCALE or IWF (Iterative Water-Filling) provides the PSDs for a given set of weights.

A possible embodiment adopts a multi-objective optimization algorithm like NSGA-II (Non-dominated Sorting Genetic Algorithm II), but any other multi-objective evolutionary algorithm could be used. To solve a problem, the evolutionary optimization algorithm keeps populations of individuals. Following the principles of natural evolution, the optimizer iteratively improves the population, generating new individuals according to mechanisms such as mutation, crossover and elitism.

In the method, when adopting a multi-objective evolutionary algorithm, each individual x represents a set of N weights, with values restricted to be in the range [0, 1]. The population size is Z, the number of operating points specified by the user. The optimizer seeks solutions in the Pareto frontier. For example, if the rate adaptive approach is assumed, it needs to calculate the vector $o=(r_1, r_2 \ldots r_N)$ with all objective functions in Eq. (3). This calculation includes invoking the adopted spectrum balancing algorithm, which receives the weights represented by x and the CI (B, $\overline{G}$) as inputs and outputs the PSDs S. This step corresponds to obtaining an operating point, which brings enough information to calculate all objective functions. The evolutionary algorithm can then improve the current population until convergence or reaching a pre-specified maximum number of iterations. The final result is a set of Z operating points (S, B, $\overline{G}$). The method is further summarized below:

1—Inputs:
  a) Z—the desired number of operating points
  b) sba—the spectrum balancing algorithm
  c) moea—the multi-objective evolutionary algorithm
  d) a set of objective functions and constraints according to Eq. (1)
  e) (B, $\overline{G}$)—channel information (CI)

2—Create an initial population $P_0$ with Z individuals $x_1, \ldots, x_Z$, each one encoding a set of N weights. These weights can be obtained, for example, from a uniform random distribution.

3—Do, while convergence:
  a) Execute sba for each individual $x_i$ to obtain the respective operating point ($S_i$, B, $\overline{G}$)
  b) Calculate the objective functions for all individuals
  c) Execute moea to improve the current population $P_t$, creating a new population $P_{t+1}$ of Z individuals, with improved objective functions and diversity When executing the method, tests have shown significant improvements in terms of a number of executions of the spectrum balancing algorithm necessary for obtaining acceptable operating points.

Of course, the communication network, central offices and modems described herein are in addition implemented according to known standards and protocols within the field of DSL communication. In fact, the invention may be implemented on present hardware equipment, as it is only a matter of implementing software instructions which when run in the computer perform the above described method.

Software instructions, i.e. a computer program code for carrying out methods performed in the previously discussed network/system may for development convenience be written in a high-level programming language such as Java, C, and/or C++ but also in other programming languages, such as, but not limited to, interpreted languages. Some modules or routines may be written in assembly language or even microcode to enhance performance and/or memory usage. It will be further appreciated that the functionality of any or all of the functional steps of the method may also be implemented using discrete hardware components, one or more application specific integrated circuits, or a programmed digital signal processor or microcontroller.

Although various embodiments of the invention have been described and shown, the invention is not restricted thereto, but may also be embodied in other ways within the scope of the subject-matter defined in the following claims. In particular, the invention may be implemented by using other techniques for iteratively calculating the set of operating points.

The invention claimed is:

1. A method of determining a diverse set of substantially Pareto optimal operating points (Z) for spectrum management of a plurality (N) of digital subscriber lines in a communications network, the method comprising:
  determining optimization criteria ($O_i$) for the digital subscriber lines;
  determining crosstalk gains ($\overline{G}_i$) for the digital subscriber lines;
  determining an initial population ($P_i$) of operating points ($x_1, \ldots, x_Z$) where each of the operating points comprises importance ratings for each digital subscriber line of the plurality of digital subscriber lines;
  calculating new values of crosstalk and power spectrum densities (S) for the digital subscriber lines by executing spectrum balancing for each operating point until the optimization criteria are fulfilled;
  calculating a new population of operating points, by executing an evolutionary algorithm; and
  iteratively calculating new values of crosstalk and power spectrum densities and new populations of operating points until a predefined stopping criterion is fulfilled, resulting in the diverse set of substantially Pareto optimal operating points (Z).

2. The method according to claim 1, wherein an operating point $O_i$(S, B, $\overline{G}$) is described by channel state information (B, $\overline{G}$) and Power Spectral Densities S for the plurality (N) of digital subscriber lines, where B represents a combined effect of digital subscriber line, DSL, impairments.

3. The method according to claim 1, wherein a final set of a operating points belong to a Pareto frontier corresponding to an optimization that seeks Power Spectral Densities S for the plurality (N) of digital subscriber lines according to:

$$\left.\begin{array}{l}\max\ O_i(S, B, \overline{G}), i = 1, \ldots, L \\ \text{s.t.}\ q_j(S) \leq 0, j = 1, \ldots, Q \\ \quad t_m(S) = 0, m = 1, \ldots, T \\ \quad 0 \leq s_n^k \leq M_k, k = 1, \ldots, K\end{array}\right\} \quad (1)$$

where $O_i$(S, B, $\overline{G}$) is the i-th objective function, the functions $q_j$ and $t_m$ are, respectively, inequality and equality constraints imposed to the solution, and the values $M_k$ correspond to a Power Spectral Density mask, with $M_k$ being the value at the h-th tone, and the element $s_n^k$ of S is the Power Spectral Value of user n at tone k, and where L, Q, T and K are positive integers denoting a total number of terms in a respective sequence, $O_i$, $q_j$, $t_m$ and $M_k$.

4. The method according to claim 3, wherein an optimal operating point, when using rate-adaptation, belongs to a Pareto frontier corresponding to the optimization of the equation of claim 3, with $O_n=r_n$ and $q_n=p_n-p_n^{max}\leq 0$, $\forall n$, wherein all Z operating points can be non-dominated solutions of:

$$\left.\begin{array}{l}\max\ r_n, \quad n = 1, \ldots, N \\ \text{s.t.}\ p_n \leq p_n^{max}, \quad n = 1, \ldots, N\end{array}\right\} \quad (3)$$

where $r_n=R_n$(S, B, $\overline{G}$) is the bit rate and $p_n=P_n$(S, B, $\overline{G}$) is the transmit power of the n-th user, where $R_n$ and $P_n$ are the corresponding (many-to-one) mappings.

5. A system configured to determine a diverse set of substantially Pareto optimal operating points (Z) for spectrum management of a plurality (N) of digital subscriber lines in a communications network, the system comprising
a microprocessor coupled with a memory, the memory storing instructions that, when the instructions are executed by the microprocessor, cause the system to:
determine optimization criteria ($O_i$) for the digital subscriber lines;
determine crosstalk gains ($\overline{G}_i$) for the digital subscriber lines;
determine an initial population ($P_i$) of operating points ($x_1$, ..., $x_Z$) where each of the operating points comprises importance ratings for each digital subscriber line of the plurality of digital subscriber lines; and
until a predefined stopping criterion is fulfilled, resulting in the diverse set of substantially Pareto optimal operating points (Z), iteratively calculate:
new values of crosstalk and power spectrum densities (S) for the digital subscriber lines, by executing spectrum balancing for each operating point until the optimization criteria are fulfilled; and
a new population of operating points, by executing an evolutionary algorithm.

6. The system according to claim 5, wherein an operating point $O_i(S, B, \overline{G})$ is described by channel state information (B, $\overline{G}$) and Power Spectral Densities S for the plurality (N) of digital subscriber lines, where B represents a combined effect of DSL impairments.

7. The system according to claim 5, wherein a final set of operating points belong to a Pareto frontier corresponding to an optimization that seeks Power Spectral Densities S for the plurality (N) of digital subscriber lines according to:

$$\left.\begin{aligned}\max \quad & O_i(S, B, \overline{G}), i = 1, \ldots, L \\ \text{s.t.} \quad & q_j(S) \leq 0, j = 1, \ldots, Q \\ & t_m(S) = 0, m = 1, \ldots, T \\ & 0 \leq s_n^k \leq M_k, k = 1, \ldots, K\end{aligned}\right\} \quad (1)$$

where $O_i(S, B, \overline{G})$ is the i-th objective function, the functions $q_j$ and $t_m$ are, respectively, inequality and equality constraints imposed to the solution, and the values $M_k$ correspond to a Power Spectral Density mask with $M_k$ being the value at the k-th tone, and the element $s_n^k$ of S is the Power Spectral Value of user n at tone h, and where L, Q, T and K are positive integers denoting a total number of terms in a respective sequence of $O_i$, $q_j$, $t_m$ and $M_k$.

8. The system according to claim 7, wherein an optimal operating point, when using rate-adaptation, belongs to a Pareto frontier corresponding to the optimization of the equation of claim 7 with $O_n = r_n$ and $q_n = p_n - p_n^{max} \leq 0$, $\forall n$, wherein all Z operating points can be non-dominated solutions of:

$$\left.\begin{aligned}\max \quad & r_n, \quad n = 1, \ldots, N \\ \text{s.t.} \quad & p_n \leq p_n^{max}, \quad n = 1, \ldots, N\end{aligned}\right\} \quad (3)$$

where $r_n = R_n(S, B, \overline{G})$ is the bit rate and $p_n = P_n(S, B, \overline{G})$ is the transmit power of the n-th user, where $R_n$ and $P_n$ are the corresponding (many-to-one) mappings.

9. A non-transitory computer program for determining a diverse set of substantially Pareto optimal operating points (Z) for spectrum management of a plurality (N) of digital subscriber lines in a communications network, comprising code which when run on a computer system that comprises a microprocessor, coupled with a memory storing instructions that, when the instructions are executed by the microprocessor, causes the computer system to:
determine optimization criteria ($O_i$) for the digital subscriber lines;
determining crosstalk gains ($\overline{G}_i$) for the digital subscriber lines;
determine an initial population ($P_i$) of operating points ($x_1$, ..., $x_Z$) where each of the operating points comprises importance ratings for each digital subscriber line of the plurality of digital subscriber lines;
calculate new values of crosstalk and power spectrum densities (S) for the digital subscriber lines, by executing spectrum balancing for each operating point until the optimization criteria are fulfilled;
calculate a new population of operating points, by executing an evolutionary algorithm; and
iteratively perform the steps of calculating until a predefined stopping criterion is fulfilled, resulting in the diverse set of substantially Pareto optimal operating points (Z).

* * * * *